(12) United States Patent
Hirokawa (10) Patent No.: US 8,670,367 B2
(45) Date of Patent: Mar. 11, 2014

(54) MOBILE TERMINAL, METHOD AND PROGRAM OF NOTIFYING INCOMING CALL FOR MOBILE TERMINAL

(75) Inventor: Yohei Hirokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 409 days.

(21) Appl. No.: 12/515,910

(22) PCT Filed: Oct. 24, 2007

(86) PCT No.: PCT/JP2007/071156
§ 371 (c)(1),
(2), (4) Date: May 21, 2009

(87) PCT Pub. No.: WO2008/065844
PCT Pub. Date: Jun. 5, 2008

(65) Prior Publication Data
US 2010/0081481 A1    Apr. 1, 2010

(30) Foreign Application Priority Data
Nov. 27, 2006    (JP) .................................. 2006-318672

(51) Int. Cl.
*H04W 4/00*        (2009.01)
(52) U.S. Cl.
USPC ........................................................ 370/313
(58) Field of Classification Search
USPC ............. 455/567, 566, 575.3, 73, 550.1, 403, 455/404.1, 415; 370/310, 312, 328, 313, 370/252, 463, 389
See application file for complete search history.

(56) References Cited

U.S. PATENT DOCUMENTS 5,870,684 A * 2/1999 Hoashi et al. ................. 455/567
6,662,022 B1   12/2003 Kanamori et al.
(Continued)

FOREIGN PATENT DOCUMENTS

JP    H11-284712 A    10/1999
JP    2001230859 A    8/2001
(Continued)

OTHER PUBLICATIONS

International Search Report for PCT/JP2007/071155 mailed Jan. 15, 2008.
(Continued)

*Primary Examiner* — Anh Ngoc Nguyen
(74) *Attorney, Agent, or Firm* — Sughrue Mion, PLLC (57) ABSTRACT

Counting of time is started when a housing of a foldable type of mobile terminal changes from an open state to a close state, and it is detected whether it is during counting or not when there is an incoming call. In the case where it is during counting, count time is acquired to check whether it is less than predetermined time or not. In the case where it is not during counting, operating states of a display section 4 and a backlight 5 are detected to check whether they are coincident with operating states registered in advance or not. In the case where the count time is less than the predetermined time, or in the case where the operating states of the display section 4 and the backlight 5 are coincident with them, a ring tone is outputted with first sound volume. In the case where the count time is the predetermined time or more, or in the case where the operating states of the display section 4 and the backlight 5 are not coincident with them, a ring tone is outputted with second sound volume.

24 Claims, 7 Drawing Sheets

(56) References Cited

U.S. PATENT DOCUMENTS

| | | | |
|---|---|---|---|
| 7,089,044 B2 * | 8/2006 | Ohta ........................... | 455/575.3 |
| 7,162,274 B2 * | 1/2007 | Hama et al. ................... | 455/566 |
| 7,280,648 B2 * | 10/2007 | Matsunaga et al. ...... | 379/142.01 |
| 7,330,402 B2 * | 2/2008 | Sakata ........................... | 368/10 |
| 7,966,006 B2 * | 6/2011 | Sakamoto et al. ............ | 455/418 |
| 8,059,088 B2 * | 11/2011 | Eid et al. ....................... | 345/156 |
| 2002/0028662 A1 | 3/2002 | Yoshinaga | |
| 2006/0121886 A1 | 6/2006 | Maehara et al. | |
| 2008/0248816 A1 | 10/2008 | Hatano et al. | |

FOREIGN PATENT DOCUMENTS

| | | |
|---|---|---|
| JP | 200284343 A | 3/2002 |
| JP | 2002261888 A | 9/2002 |
| JP | 2004040313 A | 2/2004 |
| JP | 2004173049 A | 6/2004 |
| JP | 2005167909 A | 6/2005 |
| JP | 2006042077 A | 2/2006 |
| JP | 2006140759 A | 6/2006 |
| JP | 2006197625 A | 7/2006 |
| JP | 2006-254192 A | 9/2006 |
| WO | 2006022076 A1 | 3/2006 |
| WO | 2006080068 A | 8/2006 |

OTHER PUBLICATIONS

Japanese Office Action for JP2008-546922 mailed on Aug. 22, 2012.
Japanese Office Action for JP2008-546922 mailed on Nov. 14, 2012.

* cited by examiner

MOBILE TERMINAL, METHOD AND PROGRAM OF NOTIFYING INCOMING CALL FOR MOBILE TERMINAL

This application is the National Phase of PCT/JP2007/071156, filed Oct. 24, 2007, which is based upon Japanese patent application No. 2006-318672, filed Nov. 27, 2006, the disclosure of which is incorporated herein in its entirety by reference.

TECHNICAL FIELD

The present invention relates to a mobile terminal such as a cellular phone, and particularly, the present invention relates to control of volume of a ring tone at an incoming call and switching control of incoming call notifying means.

BACKGROUND ART

A technique related to control of volume of ring tone in a mobile terminal is described in paragraphs "0048" to "0051" and "0056" to "0061", FIG. 1 and the like in Japanese Patent Application Publication No. 2006-42077 (hereinafter, referred to as "Patent Document 1"), for example. This Patent Document 1 discloses that:

in a foldable type of mobile terminal, an open or close state indicating whether a mobile terminal is folded or opened at an incoming call is detected;

in the case of the close state, a ring tone is outputted with a user setting value of volume; and in the case of the open state, it is checked whether or not the user setting value of volume is the maximum permissible value predefined or less, and in the case where it is so, the ring tone is outputted with the user setting value of volume, or in the case where it is not so, it is outputted with a value of volume close to the maximum permissible value.

Further, it also discloses:

it is checked, at an incoming call, whether it is in an operating state such as during a call or during reproduction of a voice memo; and in the case where it is in the operating state such as during a call or during reproduction of a voice memo, the smaller volume of ring tone is outputted compared with the case where it is not so.

DISCLOSURE OF THE INVENTION

Problems to be Solved by the Invention

In Patent Document 1 mentioned above, the volume of ring tone is controlled depending on whether a mobile terminal is opened or closed at an incoming call, and it is not considered how long time lapses since it has been closed. For this reason, even in the case where there is an incoming call immediately after closing (for example, after three seconds), or even in the case where there is an incoming call after a lapse of a certain amount of time since it has been closed (for example, ten minutes), it leads to the same volume of ring tone. In the case where there is an incoming call after a lapse of a certain amount of time since it has been closed (for example, ten minutes), it is determined that it is not in a state where a user does not use a mobile terminal and does not hold it with his or her hand. Thus, it needs to output a ring tone with certain volume in order to notice it. However, in the case where there is an incoming call immediately after closing, it is assumed that it is in a state where the mobile terminal is still held in the user's hand. Thus, it is possible to notice it with the smaller volume of ring tone adequately. As stated above, Patent Document 1 makes no reference to a point that it is monitored how long time lapses since the mobile terminal has been closed and control of the volume of ring tone according to it is carried out.

Further, Patent Document 1 mentioned above describes that an operating state such as during a call or during reproduction of a voice memo is checked at an incoming call and the volume of ring tone is controlled in accordance with a check result. However, it makes no reference to control of the volume of ring tone according to presence or absence of a general operation in the mobile terminal (for example, detection of an operation state by checking a state of a display section, a backlight and the like, control of the volume of ring tone according to it, and the like) as well as operations during a call or during reproduction of a voice memo.

It is an object of the present invention to provide a mobile terminal, a method and a program of notifying an incoming call for a mobile terminal, which solve the problems described above.

Means for Solving the Problems

In order to solve the problems described above, as one aspect thereof, the present invention provides a mobile terminal including notification outputting means for notifying a user of an incoming call, the mobile terminal including: determining means for determining, in accordance with an operating state of the mobile terminal, at least one of an output carried out in response to an incoming call to the mobile terminal by the notification outputting means and a type of the notification outputting means.

Further, as another aspect, the present invention provides a method of notifying a user of an incoming call to a mobile terminal, the method including: a determining step of determining, in accordance with an operating state of the mobile terminal, at least one of an output of notification to the user of the mobile terminal carried out in response to an incoming call to the mobile terminal and a kind of notification output.

Moreover, as still another aspect, the present invention provides a computer program executed by a control device of a mobile terminal, the mobile terminal including notification outputting means for notifying a user of an incoming call, wherein the computer program causes the control device to function as determining means for determining, in accordance with an operating state of the mobile terminal, at least one of an output carried out in response to an incoming call to the mobile terminal by the notification outputting means and a type of the notification outputting means.

The determining means or the determining step determines an output carried out by the notification outputting means, but the output determined here indicates a size or contents of an output. The size of the output is volume of a ring tone or strength of vibration of a vibrator, for example. The contents of the output are a kind of a ring tone or display contents displayed by a display device, for example.

Effects of the Invention

In the present invention, in the case where there is an incoming call in the state where a user holds a mobile terminal such as immediately after the mobile terminal is folded or in operation, change in sound volume of a ring tone is carried out, or a vibrator is caused to operate in place of the ring tone. Thus, an effect that the user can be notified of an incoming call without outputting a ring tone with excessive sound vol-

BEST MODE FOR CARRYING OUT THE INVENTION

The present invention will be described in detail on the basis of embodiments with reference to the drawings.

Figure 1:
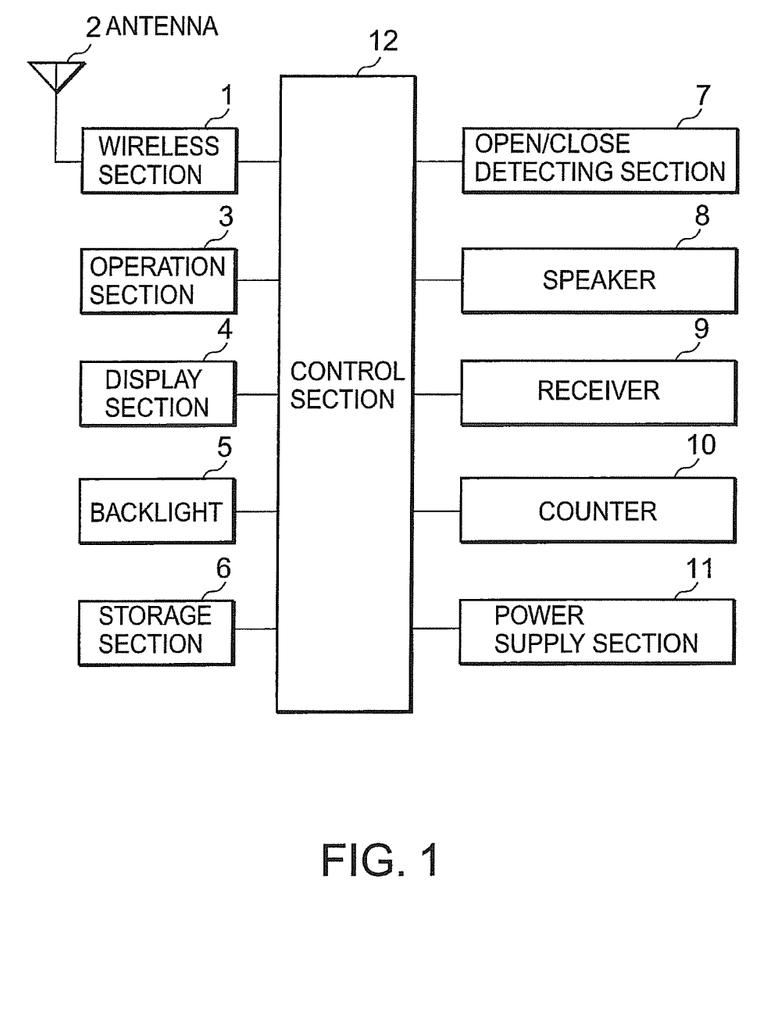
FIG. 1 is a view showing a configuration of a mobile terminal according to a first embodiment of the present invention.

FIG. 1 is a view showing a configuration of a mobile terminal according to a first embodiment of the present invention. The mobile terminal of the present invention is a mobile communication terminal such as a cellular phone and a PHS (Personal Handyphone System), and it is assumed that the mobile terminal according to the present embodiment is a foldable type of mobile terminal. Referring to FIG. 1, this mobile terminal includes: a wireless section 1; an antenna 2; an operation section 3; a display section 4; a backlight 5; a storage section 6; an open/close detecting section 7; a speaker 8; a receiver 9; a counter 10; a power supply section 11; and a control section 12.

The wireless section 1 is a communication device that carries out transmission and reception of radio signals to and from a base station (not shown in the drawings) via the antenna 2, and the operation section 3 is an input device such as a numeric keypad, a function key and a pointing device. The display section 4 is a display device such as an LCD (Liquid Crystal Display). The backlight 5 is a lighting device for emitting light by means of a light source such as a light emitting diode, and shines light on the operation section 3 and the display section 4.

The storage section 6 is a storage device in which programs for controlling operation of the control section 12, a work area for the control section 12, various data and the like are stored. In this storage section 6, a standard value of volume and an operative value of volume for respectively specifying a value of volume of a ring tone and a threshold value of close state duration of the mobile terminal are stored in advance. The standard value of volume is a value of volume of a ring tone in the case where there is an incoming call in the state where a user does not operate the mobile terminal, and is set to a larger value of volume than the operative value of volume in order to cause the user to notice it. The operative value of volume is a value of volume of a ring tone in the case where there is an incoming call in the state where the user operates the mobile terminal, and is set to a smaller value of volume than the standard value of volume because the mobile terminal is held by a hand of the user and the smaller value of volume is thereby sufficient. In this regard, immediately after the mobile terminal is closed (from the time when it is closed to less than the threshold value of close state duration of the mobile terminal), it is assumed that the user still holds the mobile terminal. Thus, it is assumed to be operating it even when it is not operated, a ring tone is outputted with the operative value of volume. The threshold value of close state duration of the mobile terminal is time to determine whether it is assumed that less than what seconds from the time when the mobile terminal is closed is in operation or a mobile terminal holding state and is three seconds, for example. These standard value of volume, operative value of volume and threshold value of close state duration of the mobile terminal may be selected and set from a menu screen or the like by the user, or may be set in advance by a mobile terminal carrier.

The open/close detecting section 7 has a function to detect an open or close state of a housing of the foldable type of mobile terminal. As examples of this open/close detecting section 7, one using a magnet and a magnetic sensor and one by a light emitting section and a light receiving section are respectively disclosed in Japanese Patent Application Publication No. 2002-125025 and Japanese Patent Application Publication No. 2001-22472, for example. The present invention is not limited to the open/close detecting means. Further, since it is not a purpose to explain details of a detecting method, any further explanation is omitted. The speaker 8 is an outputting section to output a ring tone and the like, and the receiver 9 outputs a voice of a person talking on a telephone. The counter 10 has a function to carry out counting of elapsed time on the basis of clocks, and the power supply section 11 is provided with a battery to supply a power source to respective sections in the mobile terminal.

The control section 12 is a control device such as a CPU (Central Processing Unit) for executing control of the entire mobile terminal, and an operation thereof is controlled by a program. This control section 12 includes:

means for setting a standard value of volume, an operative value of volume and a threshold value of close state duration of the mobile terminal in the storage section 6 in advance;

means for starting to count elapsed time by means of the counter 10 when the mobile terminal becomes a folded close state;

means for checking, at an incoming call, whether the count value by the counter 10 is less than a predetermined value (threshold value of close state duration of the mobile terminal) or not;

means for acquiring, in the case where it is less than the predetermined value, the operative value of volume from the storage section 6, amplifying a ring tone so as to become the operative value of volume, and sending out it to the speaker 8; and means for acquiring, in the case where it is not less than the predetermined value, the standard value of volume from the storage section 6, amplifying a ring tone so as to become the standard value of volume, and sending out it to the speaker 8.

Next, an operation of the first embodiment of the present invention will be described with reference to FIGS. 1 and 2. In this regard, FIG. 2 is a flowchart showing an operation of the first embodiment of the present invention.

Figure 2:
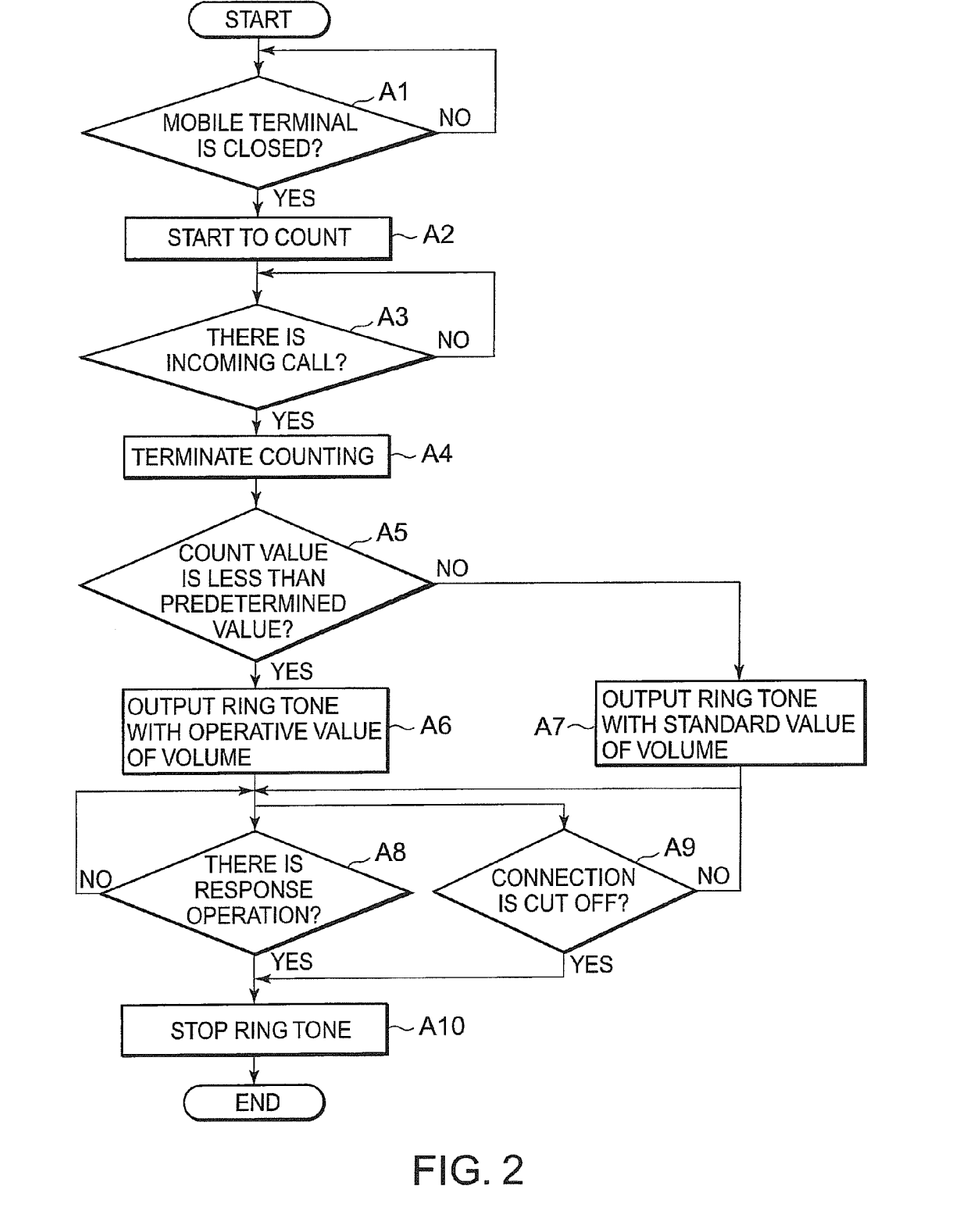
FIG. 2 is a flowchart showing an operation of the first embodiment of the present invention.

Referring to FIG. 2, the open/close detecting section 7 detects an open or close state of the mobile terminal. When the mobile terminal is folded (in other words, when the mobile terminal changes from an open state to a close state), the control section 12 is notified of that effect (Step A1). The control section 12 that received the notification instructs the counter 10 to start to count, and the counter 10 starts to count (Step A2). Then, in the case where there is an incoming call (Step A3), the control section 12 acquires a count value of the counter 10 at that time, and instructs the counter 10 to terminate counting. The counter 10 receives the instruction of the control section 12 to terminate counting and reset the count value (Step A4). In this regard, although it is not shown in the drawings, in the case where the mobile terminal is opened in the state where there is no incoming call after starting to count at Step A2 (in the case of changing from a close state to an open state), the control section 12 also instructs the counter 10 to terminate counting. The counter 10 receives the instruction of the control section 12 to terminate counting and reset the count value.

Next, the control section 12 acquires a threshold value of close state duration of the mobile terminal stored in the storage section 6 to check it against the count value acquired at Step A4 (Step A5). As a result of the check, in the case where the count value is less than the threshold value of close state duration of the mobile terminal, a ring tone is outputted with the operative value of volume. Specifically, the control section 12 selects and acquires the operative value of volume stored in the storage section 6, amplifies the ring tone so as to become the operative value of volume, and sends out it to the speaker 8. The speaker 8 outputs the received ring tone (Step A6). As a result of the check, in the case where the count value is not less than the threshold value of close state duration of the mobile terminal, a ring tone is outputted with the standard value of volume. Specifically, the control section 12 selects and acquires the standard value of volume stored in the storage section 6, amplifies the ring tone so as to become the standard value of volume, and sends out it to the speaker 8. The speaker 8 outputs the received ring tone (Step A7).

Then, when the user carries out a response operation against the operation section 3 (Step A8) or connection is cut off by a cutoff operation or the like of a source (Step A9), the control section 12 causes the speaker 8 to stop outputting the ring tone therefrom (Step A10).

As explained above, in the present embodiment, in the case where there is an incoming call within predetermined time immediately after the mobile terminal is closed, the ring tone is to be outputted with the operative value of volume smaller than the standard value of volume. Thus, in the case where there is an incoming call in the state where the user holds the mobile terminal without in operation, it is possible to prevent a ring tone with excessive sound volume more than necessary from being outputted, and consequently, an effect that it is also possible to prevent a bad influence on a sense of hearing can be obtained.

Next, a second embodiment of the present invention will be described.

The present embodiment is characterized in that it is determined whether a mobile terminal is in operation or not on the basis of an ON or OFF state of display of a display section 4 or a turn-on state of a backlight 5, and a value of volume of a ring tone is changed and outputted in accordance with whether it is in operation or not. Since the mobile terminal according to the present embodiment is not limited to a foldable type of mobile terminal, an open/close detecting section 7 is not required compared with the configuration of the mobile terminal according to the first embodiment (FIG. 1).

Next, an operation of the second embodiment of the present invention will be described with reference to FIGS. 1 and 3. In this regard, FIG. 3 is a flowchart showing an operation of the second embodiment of the present invention.

Figure 3:
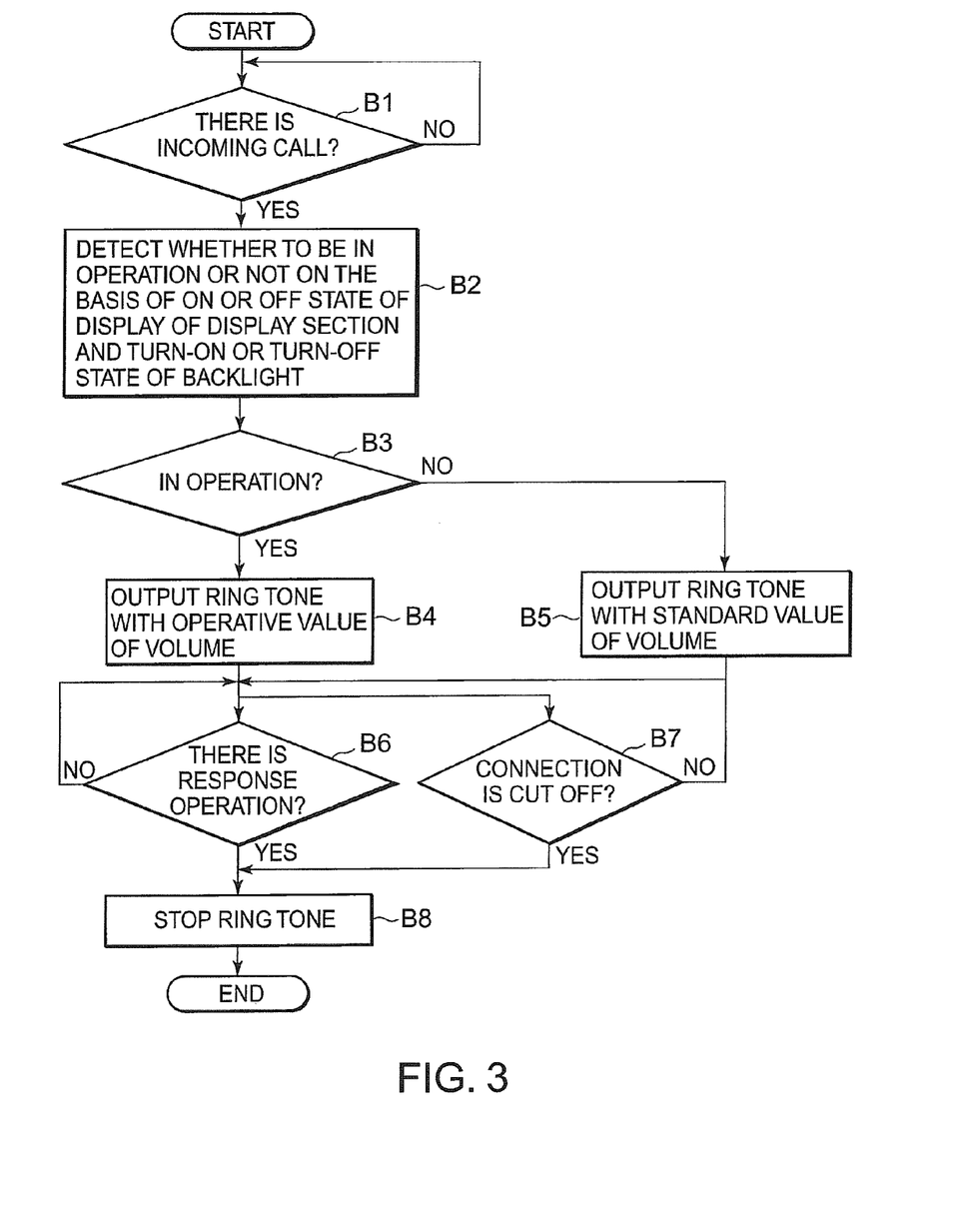
FIG. 3 is a flowchart showing an operation of a second embodiment of the present invention.

Referring to FIG. 3, in the case where there is an incoming call (Step B1), a control section 12 confirms an ON or OFF state of display of the display section 4 and a turn-on or turn-off state of the backlight 5, and determines whether the mobile terminal is in an operation state or not on the basis of these. In order to reduce power consumption, the mobile terminal normally carries out power saving control in which the display section 4 or the backlight 5 is set to an OFF state in the case where it is not used (in the case where it is not operated). Then, in the operation state, control is executed in which, for example, display of the display section 4 is set to the ON state and the backlight 5 is turned on, or display of the display section 4 is set to the ON state but the backlight 5 is turned on only when its environment becomes dark. Thus, the control for the display section 4 and the backlight 5 in the operation state is not always the same as mobile terminals. Therefore, in each mobile terminal, an operating state of the display section 4 and the backlight 5 in the operation state is set up in a storage section 6. The control section 12 determines whether the mobile terminal is in operation or not by checking an ON or OFF state of display of the display section 4 and a turn-on or turn-off state of the backlight 5 confirmed at an incoming call against the operating state of the display section 4 and the backlight 5 in the operation state stored in the storage section 6 (Step B2).

In the case where a state of the mobile terminal at the incoming call is in operation, the control section 12 selects and acquires an operative value of volume stored in the storage section 6, amplifies a ring tone so as to become the operative value of volume, and sends out it to a speaker 8. The speaker 8 outputs the received ring tone (Step B3→Step B4). In the case where the state of the mobile terminal at the incoming call is not in operation, the control section 12 selects and acquires a standard value of volume stored in the storage section 6, amplifies the ring tone so as to become the standard value of volume, and sends out it to the speaker 8. The speaker 8 outputs the received ring tone (Step B3→Step B5). Then, when the user carries out a response operation against an operation section 3 (Step B6) or connection is cut off by a cutoff operation or the like of a source (Step B7), the control section 12 causes the speaker 8 to stop outputting the ring tone therefrom (Step B8).

As explained above, in the present embodiment, it is determined whether it is in operation or not by checking the state of the display section 4 and the backlight 5 at an incoming call. In the case where it is in operation, a ring tone is to be outputted with the operative value of volume smaller than the standard value of volume. Thus, in the case where there is an incoming call in the state where the user operates the mobile terminal, it is possible to prevent a ring tone with excessive sound volume more than necessary from being outputted, and consequently, an effect that it is also possible to prevent a bad influence on a sense of hearing can be obtained.

Next, a third embodiment of the present invention will be described.

The present embodiment is characterized by combining the first embodiment and the second embodiment. A configuration of a mobile terminal according to the present embodiment is the same as that in FIG. 1 (the configuration of the mobile terminal according to the first embodiment).

Next, an operation of the third embodiment of the present invention will be described with reference to FIGS. 1 and 4. In this regard, FIG. 4 is a flowchart showing an operation of the third embodiment of the present invention.

Figure 4:
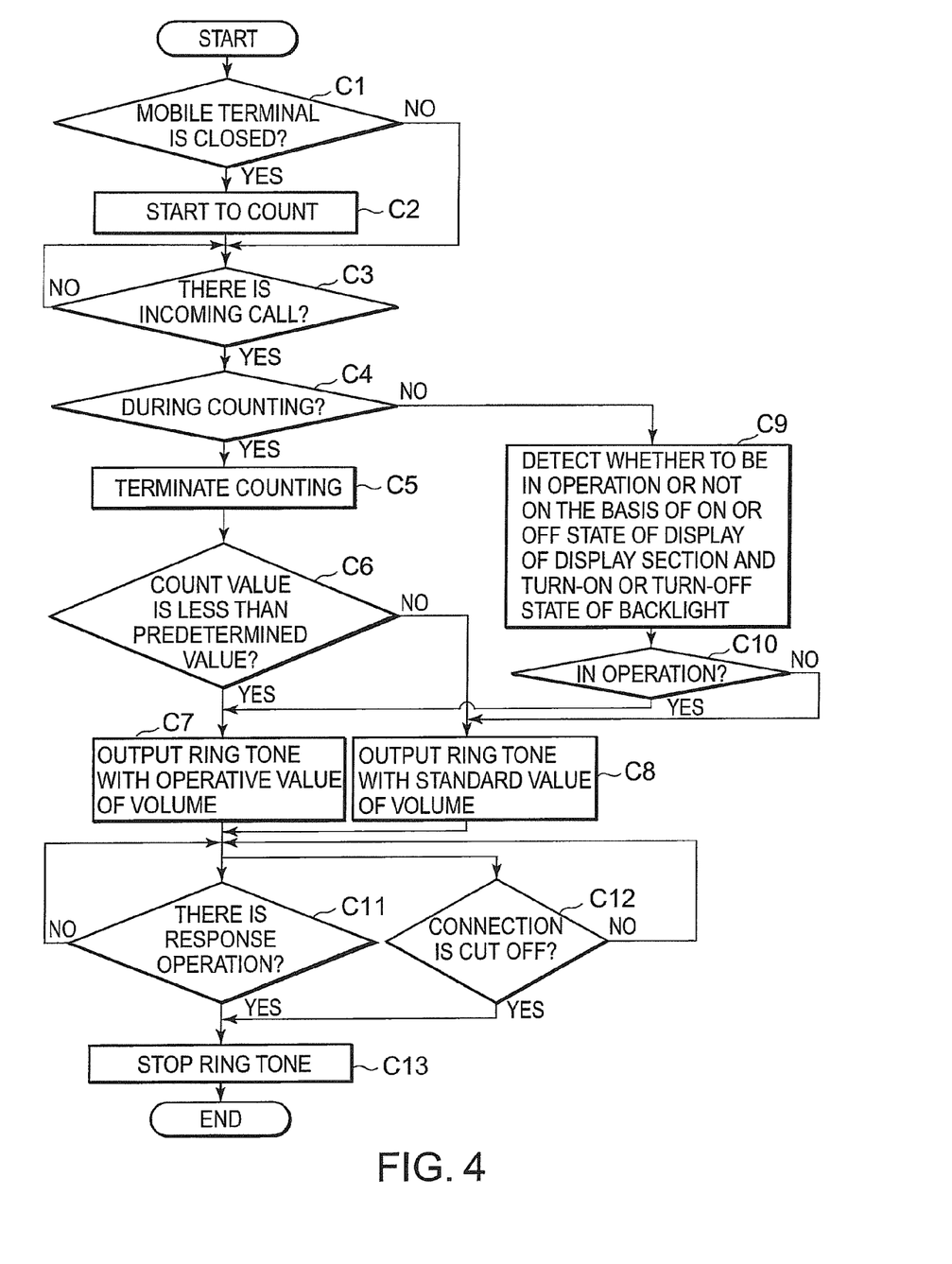
FIG. 4 is a flowchart showing an operation of a third embodiment of the present invention.

Referring to FIG. 4, the open/close detecting section 7 detects an open or close state of the mobile terminal. When the mobile terminal is folded (in other words, when the mobile terminal changes from an open state to a close state), the control section 12 is notified of that effect. Otherwise (in the case where it does not change from an open state to a close state), it proceeds to Step C3 (Step C1). The control section 12 that received the notification instructs the counter 10 to start to count, and the counter 10 starts to count (Step C2). Then, in the case where there is an incoming call (Step C3), the control section 12 confirms whether counting by the counter 10 is made or not (Step C4). In the case where the counting is made, the control section 12 acquires a count value of the counter 10 at that time, and instructs the counter 10 to terminate counting. The counter 10 receives the instruction of the control section 12 to terminate counting and reset the count value (Step C5). In this regard, although it is not shown in the drawings, in the case where the mobile terminal is opened in the state where there is no incoming call after starting to count at Step A2 (in the case of changing from a close state to an open state), the control section 12 also instructs the counter 10 to terminate counting. The counter 10 receives the instruction of the control section 12 to terminate counting and reset the count value.

Next, the control section 12 acquires a threshold value of close state duration of the mobile terminal stored in the storage section 6 to check it against the count value acquired at Step C5 (Step C6). As a result of the check, in the case where the count value is less than the threshold value of close state duration of the mobile terminal, a ring tone is outputted with an operative value of volume. Specifically, the control section 12 selects and acquires the operative value of volume stored in the storage section 6, amplifies the ring tone so as to become the operative value of volume, and sends out it to the speaker 8. The speaker 8 outputs the received ring tone (Step C7). As a result of the check, in the case where the count value is not less than the threshold value of close state duration of the mobile terminal, a ring tone is outputted with a standard value of volume. Specifically, the control section 12 selects and acquires the standard value of volume stored in the storage section 6, amplifies the ring tone so as to become the standard value of volume, and sends out it to the speaker 8. The speaker 8 outputs the received ring tone (Step C8).

At Step C4, in the case where the counting by the counter 10 is not made, the control section 12 confirms an ON or OFF state of display of the display section 4 and a turn-on or turn-off state of the backlight 5, and determines whether the mobile terminal is in operation or not on the basis of these. Specifically, the control section 12 determines whether it is in operation or not by checking an ON or OFF state of display of the display section 4 and a turn-on or turn-off state of the backlight 5 confirmed at an incoming call against the state of the display section 4 and the backlight 5, which are in operation, stored in the storage section 6 in advance (Step C9). In the case where a state of the mobile terminal at the incoming call is in operation, the control section 12 selects and acquires the operative value of volume stored in the storage section 6, amplifies a ring tone so as to become the operative value of volume, and sends out it to a speaker 8. The speaker 8 outputs the received ring tone (Step C10→Step C7). In the case where the state of the mobile terminal at the incoming call is not in operation, the control section 12 selects and acquires a standard value of volume stored in the storage section 6, amplifies the ring tone so as to become the standard value of volume, and sends out it to the speaker 8. The speaker 8 outputs the received ring tone (Step C10→Step C8). Then, when the user carries out a response operation against an operation section 3 (Step C11) or connection is cut off by a cutoff operation or the like of a source (Step C12), the control section 12 causes the speaker 8 to stop outputting the ring tone therefrom (Step C13).

As explained above, the present embodiment includes both the first and second embodiments. Thus, an effect that, both in the case where there is an incoming call within a predetermined time immediately after the mobile terminal is closed (not in operation, but a holding state) and in the case where there is an incoming call when it is in operation, it is possible to prevent a ring tone with excessive sound volume more than necessary from being outputted, can be obtained.

Next, a fourth embodiment of the present invention will be described.

The present embodiment is characterized in that means for changing volume of ring tone on the basis of whether a specific function is running at an incoming call or not is further added to the first embodiment. Here, the specific function is a function to playback music, a function to reproduce animation or the like, for example, and is registered in a storage section 6 in advance. A configuration of a mobile terminal according to the present embodiment is the same as that in FIG. 1 (the configuration of the mobile terminal according to the first embodiment).

Next, an operation of the fourth embodiment of the present invention will be described with reference to FIGS. 1, 4 and 5. In this regard, FIG. 5 is a flowchart showing an operation of the fourth embodiment of the present invention.

Figure 5:
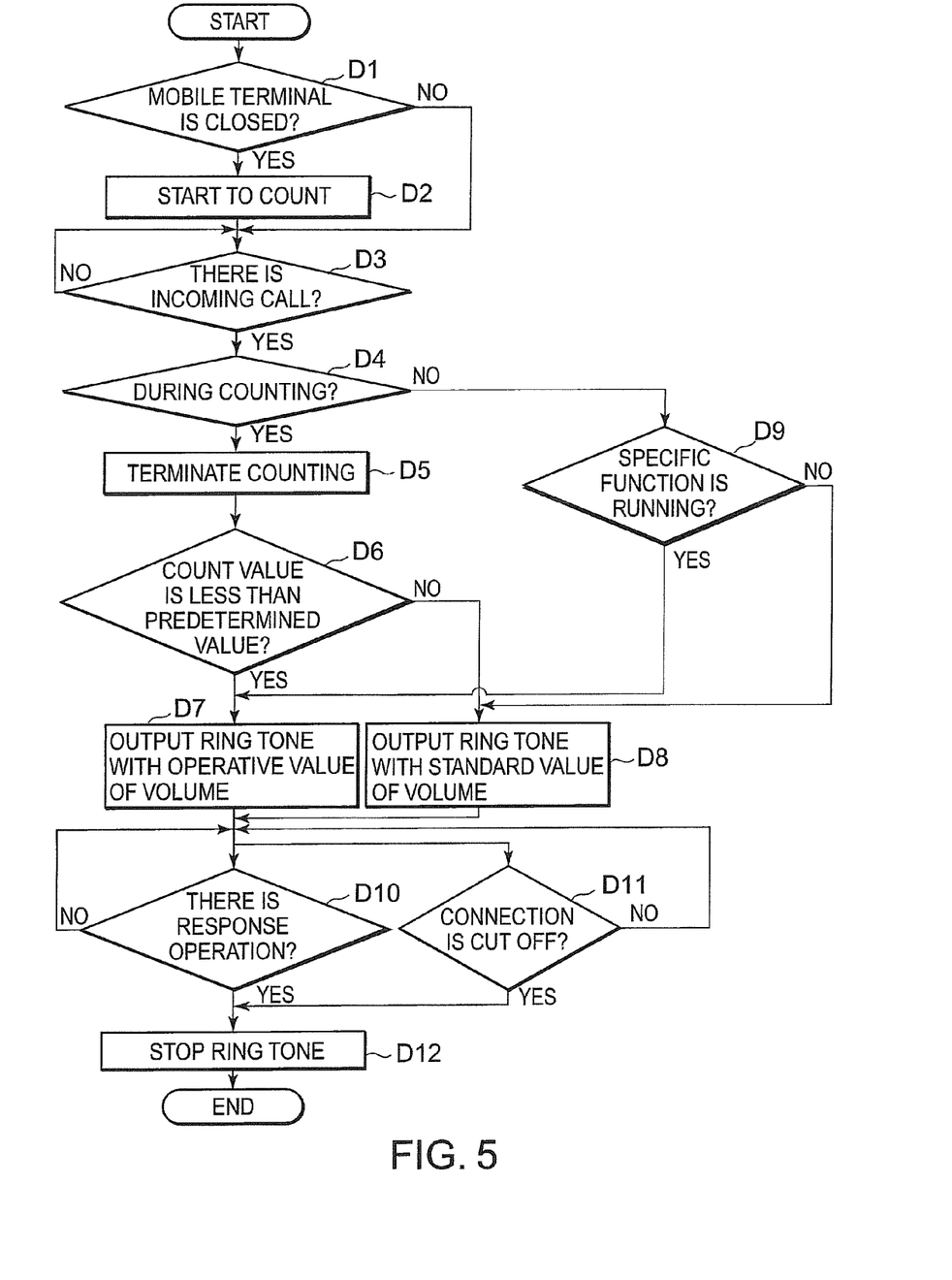
FIG. 5 is a flowchart showing an operation of a fourth embodiment of the present invention.

Referring to FIG. 5, since Steps D1 to D8 and Steps D10 to D12 are the same as Steps C1 to C8, Steps C11 to C13 of FIG. 4 (third embodiment), its explanation is omitted, and Step D9 will hereinafter be described. At Step D4, in the case where counting by a counter 10 is not made, a control section 12 detects a function that is running in the mobile terminal, and checks whether it is coincident with functions registered in the storage section 6 in advance or not (Step D9). After this, in the case of being coincident with them, a ring tone is outputted with an operative value of volume. In the case of not being coincident with them, a ring tone is outputted with a standard value of volume (Step D9→Steps D7, D8).

As explained above, in the present embodiment, in addition to the first embodiment, control of the volume of ring tone is executed at a boot of the specific function such as playback of music. Thus, an effect that, when a distance between the mobile terminal and an ear of a user is close to each other as playback of music and the like, it is possible to prevent a ring tone with excessive sound volume more than necessary from being outputted, can be obtained further.

Next, a fifth embodiment of the present invention will be described with reference to FIGS. 2, 6 and 7. In this regard, FIG. 6 is a view showing a configuration of a mobile terminal according to a fifth embodiment of the present invention, and FIG. 7 is a flowchart showing an operation of the fifth embodiment of the present invention.

Figure 6:
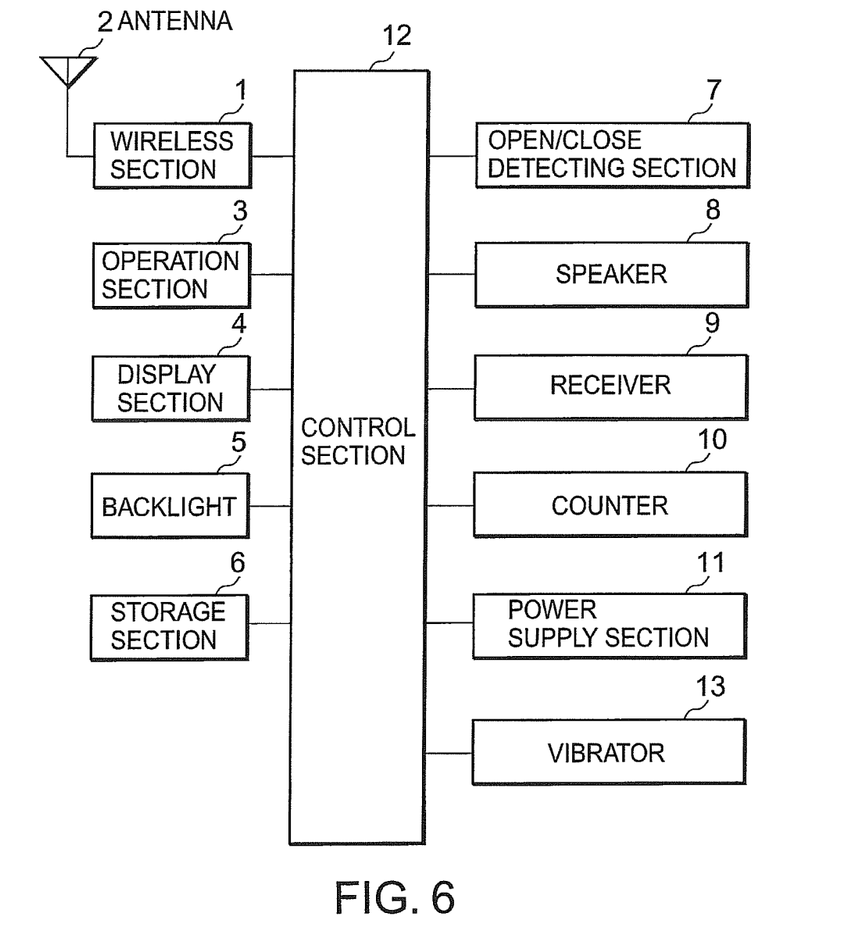
FIG. 6 is a view showing a configuration of a mobile terminal according to a fifth embodiment of the present invention.

A configuration of a mobile terminal according to the present embodiment is different from that in FIG. 1 (the configuration of the mobile terminal according to the first embodiment) only on the point that a vibrator 13 for displaying an incoming call by vibrating is added as shown in FIG. 6.

Next, an operation of the fifth embodiment of the present invention will be described.

Figure 7:
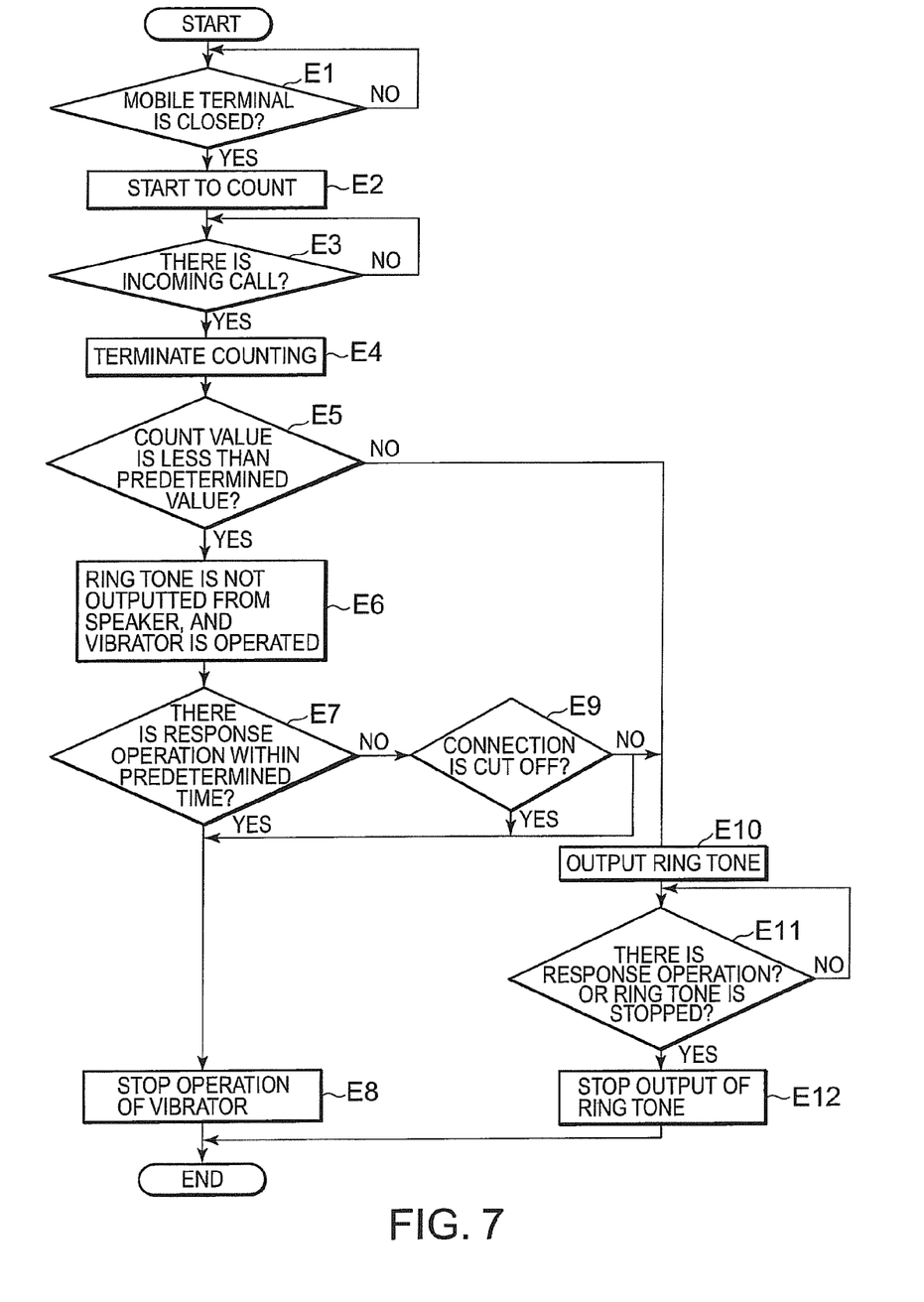
FIG. 7 is a flowchart showing an operation of the fifth embodiment of the present invention.

Referring to FIG. 7, since Steps E1 to E5 are the same as Steps A1 to A5 of FIG. 2 (first embodiment), explanation thereof is omitted, and Steps E6 to E12 will be described below.

At Step E5, in the case where a count value is not less than a threshold value of close state duration of the mobile terminal, the control section 12 causes the speaker 8 to output the ring tone therefrom (Step E5→Step E10). At Step E5, in the case where the count value is less than the threshold value of close state duration of the mobile terminal, the control section 12 causes the vibrator 13 to operate as display of an incoming call (Step E5→Step E6). Then, in the case where a user carries out a response operation from an operation section 3 within a predetermined time (for example, 30 seconds), the control section 12 causes the vibrator 13 to stop the operation (Step E7→Step E8). In the case where the response operation is not executed within the predetermined time, the control section 12 confirms whether an incoming call state is kept or not (whether connection is cut off by a cutoff operation or the like of a source or not) (Step E7→Step E9). In the case where the connection is cut off by a cutoff operation or the like of the source, the control section 12 causes the vibrator 13 to stop the operation (Step E9→Step E8). At Step E9, in the case where connection is not cut off, the control section 12 causes the vibrator 13 to stop the operation, and causes the speaker 8 to output a ring tone therefrom. In the present embodiment, unlike the first to fourth embodiments, the value of volume of the ring tone may be only one kind, the standard value of volume, and the operative value of volume is not required (Step E10). After this, when the user carries out a response operation against an operation section 3, or connection is cut off by a cutoff operation or the like of a source (Step E11), the control section 12 causes the speaker 8 to stop outputting the ring tone therefrom (Step E12).

As described above, it has been explained, using FIG. 7, as a feature of the present embodiment to cause the vibrator 13 to operate in place of the output of the ring tone with the operative value of volume in the first embodiment and to switch to output of the ring tone in the case where there is no response operation within a given time. However, the feature of the present embodiment described above is not limited to application to the first embodiment, and it can be applied to the second to fourth embodiments similarly.

As explained above, in the present embodiment, in the case where there is an incoming call in the state where the mobile terminal is held and operated, it is notified with vibration of the vibrator 13 in place of the ring tone with the operative value of volume in the first to fourth embodiments. This makes it possible to obtain an effect that it is possible to notify him or her of an incoming call without outputting a ring tone, compared with the first to fourth embodiments.

Further, in the present embodiment, in the case where there is no response within a given time since the vibrator 13 operated, it is switched to an output of a ring tone. Therefore, an effect that it is possible to notify a user of an incoming call doubly even in the case where the user does not notice an operation of the vibrator 13 can be obtained.

Although the present invention has been described in conjunction with the embodiments, the present invention is not limited to these embodiments. Needless to say, it can be changed in the technical scope of the claims.

In the present invention, the determining means may use a kind of function of the mobile terminal that is currently running as at least part of the operating state of the mobile terminal.

Further, the present invention may further include at least one of screen display means and a backlight, wherein the determining means uses at least one of operating states of the screen display means and the backlight as at least part of the operating state of the mobile terminal.

Further, in the present invention, in the case where an input for a response operation to the incoming call has not been made against the mobile terminal from the time when the output is started in accordance with the determination of the determining means by first notification outputting means until predefined time elapses, the output may be carried out by second notification outputting means that is notification outputting means other than the first notification outputting means.

Further, the present invention may further include: a counter for measuring elapsed time from the time when the mobile terminal shifts to a first operating state predefined, wherein the determining means uses a counter value of the counter as at least part of the operating state of the mobile terminal.

Further, in the present invention, wherein the mobile terminal is a foldable type of mobile terminal, and the mobile terminal may further include: means for detecting an open or close state of the folding, wherein the first operating state is the close state of the folding.

Further, in the present invention, when the counter does not carry out the measurement, the determining means may use one other than the counter value of the counter as the operating state of the mobile terminal.

Further, in the present invention, when the counter does not carry out the measurement, the determining means may use a kind of function of the mobile terminal that is currently running as at least part of the operating state of the mobile terminal.

Further, the present invention may further include: at least one of screen display means and a backlight, wherein, when the counter does not carry out the measurement, at least one of operating states of the screen display means and the light is used as at least part of the operating state of the mobile terminal.

Further, in the present invention, the counter value of the counter may be reset in accordance with an incoming call to the mobile terminal or in accordance with shift from the first operating state to other state.

This application is based upon Japanese patent application No. 2006-318672, filed Nov. 27, 2006, the disclosure of which is incorporated herein in its entirety by reference.

The invention claimed is:

1. A foldable mobile terminal comprising:
a first notification outputting means for outputting a first notification to notify a user of arrival of an incoming call, the first notification being made as one of visual, acoustic, and haptic outputs;
a second notification outputting means for outputting a second notification to notify the user of the arrival of the incoming call, the second notification being made as one of the visual, acoustic, and haptic outputs and different from the first notification; and
determining means for determining, in accordance with a comparison between an elapsed time since the foldable mobile terminal was folded and a threshold, one of the first notification outputting means and the second notification outputting means that outputs notification in response to the arrival of the incoming call to the mobile terminal.

2. The foldable mobile terminal as claimed in claim 1, wherein the determining means uses a kind of function of the foldable mobile terminal that is currently running as at least part of the operating state of the foldable mobile terminal.

3. The foldable mobile terminal as claimed in claim 1, further comprising:
at least one of screen display means and a backlight,
wherein the determining means uses at least one of operating states of the screen display means and the backlight as at least part of the operating state of the foldable mobile terminal.

4. The foldable mobile terminal as claimed in claim 1, wherein, in the case where an input for a response operation to the incoming call has not been made against the foldable mobile terminal from the time when the output is started in accordance with the determination of the determining means by first notification outputting means until predefined time elapses, the output is carried out by second notification outputting means that is notification outputting means other than the first notification outputting means.

5. The foldable mobile terminal as claimed in claim 1, further comprising:
a counter for measuring elapsed time from the time when the foldable mobile terminal shifts to a first operating state predefined,
wherein the determining means uses a counter value of the counter as at least part of the operating state of the foldable mobile terminal.

6. The foldable mobile terminal as claimed in claim 5, wherein the foldable mobile terminal is a foldable type of foldable mobile terminal, and the foldable mobile terminal further comprising:
means for detecting an open or close state of the folding,
wherein the first operating state is the close state of the folding.

7. The foldable mobile terminal as claimed in claim 5, wherein, when the counter does not carry out the measurement, the determining means uses one other than the counter value of the counter as the operating state of the foldable mobile terminal.

8. The foldable mobile terminal as claimed in claim 5, wherein, when the counter does not carry out the measurement, the determining means uses a kind of function of the foldable mobile terminal that is currently running as at least part of the operating state of the foldable mobile terminal.

9. The foldable mobile terminal as claimed in claim 5, further comprising:
at least one of screen display means and a backlight,
wherein, when the counter does not carry out the measurement, at least one of operating states of the screen display means and the light is used as at least part of the operating state of the foldable mobile terminal.

10. The foldable mobile terminal as claimed in claim 5, wherein the counter value of the counter is reset in accordance with an incoming call to the foldable mobile terminal or in accordance with shift from the first operating state to other state.

11. A method of notifying a user of an incoming call to a foldable mobile terminal, the method comprising:
a notification outputting step of outputting a first notification to notify a user of arrival of an incoming call, the first notification being made as one of visual, acoustic, and haptic outputs;
a notification outputting step of outputting a second notification to notify the user of the arrival of the incoming call, the second notification being made as one of the visual, acoustic, and haptic outputs and different from the first notification;
a determining step of determining, in accordance with a comparison between an elapsed time since the foldable mobile terminal was folded and a threshold, one of the first notification outputting step and the second notification outputting step for output of notification to the user of the foldable mobile terminal carried out in response to the arrival of the incoming call to the foldable mobile terminal.

12. The method as claimed in claim 11, wherein the determining step uses a kind of function of the foldable mobile terminal that is currently running as at least part of the operating state of the foldable mobile terminal.

13. The method as claimed in claim 11, wherein the determining step uses at least one of operating states of screen display means and a backlight as at least part of the operating state of the foldable mobile terminal.

14. The method as claimed in claim 11, wherein, in the case where an input for a response operation to the incoming call has not been made against the foldable mobile terminal from the time when the output is started in accordance with the determination in the determining step by first notification outputting means until predefined time elapses, the output is carried out by second notification outputting means that is notification outputting means other than the first notification outputting means.

15. The method as claimed in claim 11, wherein the determining step uses elapsed time from the time when the foldable mobile terminal shifts to a first operating state predefined as at least part of the operating state of the foldable mobile terminal.

16. The method as claimed in claim 15, wherein the foldable mobile terminal is of a foldable type,
wherein the first operating state is a close state of the folding.

17. The method as claimed in claim 15, wherein, when the elapsed time is not measured, the determining step uses one other than the elapsed time as the operating state of the foldable mobile terminal.

18. The method as claimed in claim 15, wherein, when the elapsed time is not measured, the determining step uses a kind of function of the foldable mobile terminal that is currently running as at least part of the operating state of the foldable mobile terminal.

19. The method as claimed in claim 15, wherein, when the elapsed time is not measured, at least one of operating states of screen display means and light is used as at least part of the operating state of the foldable mobile terminal.

20. The method as claimed in claim 15, wherein the elapsed time is reset in accordance with an incoming call to the foldable mobile terminal or in accordance with shift from the first operating state to other state.

21. A non-transitory tangible computer-readable medium storing a computer program executed by a control device of a foldable mobile terminal, the foldable mobile terminal comprising:
a first notification outputting means for outputting a first notification to notify a user of arrival of an incoming call, the first notification being made as one of visual, acoustic, and haptic outputs; and
a second notification outputting means for outputting a second notification to notify the user of the arrival of the incoming call, the second notification being made as one of the visual, acoustic, and haptic outputs and different from the first notification,
wherein the computer program causes the control device to function as determining means for determining, in accordance with a comparison between an elapsed time since the foldable mobile terminal was folded and a threshold, one of the first notification outputting means and the second notification outputting means that outputs notification in response to the arrival of the incoming call to the mobile terminal.

22. The non-transitory tangible computer-readable medium as claimed in claim 21, wherein the computer program is executed by the control device of the foldable mobile terminal that further comprises a counter for measuring elapsed time from the time when it shifts to a first operating state predefined, and
wherein the determining means uses a counter value of the counter as at least part of the operating state of the foldable mobile terminal.

23. The foldable mobile terminal claimed in claim 1, wherein the determining means selects, in accordance with an operating state of the foldable mobile terminal, one of first and second values of volume, the first and second values being predetermined.

24. The foldable mobile terminal claimed in claim 1, comprising at least two types of notification outputting means, wherein the determining means further determines, in accordance with an operating state of the foldable mobile terminal, a type of the notification outputting means.

* * * * *